United States Patent
Moulios et al.

(10) Patent No.: US 7,580,954 B1
(45) Date of Patent: Aug. 25, 2009

(54) RANDOM ACCESS ACTION LIST FOR DIGITAL SIGNAL DATA EDITING

(75) Inventors: Christopher J. Moulios, Cupertino, CA (US); Nikhil M. Bhatt, Cupertino, CA (US); Curtis A. Bianchi, Saratoga, CA (US); Albert Riley Howard, Jr., Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 492 days.

(21) Appl. No.: 11/105,060

(22) Filed: Apr. 12, 2005

(51) Int. Cl.
G06F 17/00 (2006.01)
G06F 15/00 (2006.01)
(52) U.S. Cl. ..................... 707/104.1; 712/35
(58) Field of Classification Search ............ 707/104, 707/104.1; 712/35
See application file for complete search history.

(56) References Cited

U.S. PATENT DOCUMENTS

| | | | | |
|---|---|---|---|---|
| 5,307,452 A * | 4/1994 | Hahn et al. | ............... | 345/592 |
| 5,442,744 A * | 8/1995 | Piech et al. | ............... | 715/500.1 |
| 5,574,905 A * | 11/1996 | deCarmo | ............... | 707/1 |
| 5,652,851 A * | 7/1997 | Stone et al. | ............... | 715/804 |
| 5,659,747 A * | 8/1997 | Nakajima | ............... | 713/1 |
| 5,675,752 A * | 10/1997 | Scott et al. | ............... | 715/866 |
| 5,742,283 A * | 4/1998 | Kim | ............... | 715/500.1 |
| 5,884,059 A * | 3/1999 | Favor et al. | ............... | 712/215 |
| 5,890,181 A * | 3/1999 | Selesky et al. | ............... | 715/530 |
| 6,204,840 B1 * | 3/2001 | Petelycky et al. | ............... | 715/500.1 |
| 6,262,723 B1 * | 7/2001 | Matsuzawa et al. | ............... | 715/723 |
| 6,567,349 B2 * | 5/2003 | Nagata et al. | ............... | 369/30.07 |

OTHER PUBLICATIONS

Fulton, Nancy, "Autodesk VIZ: Working with the Modifier Stack," Autodesk Inc., 2005, located at http://autodesk.com/adsk/servlet/item?siteID=123112&id=3455924&linkID=982674, 9 pages.

* cited by examiner

*Primary Examiner*—Shahid A Alam
*Assistant Examiner*—Joshua Bullock
(74) *Attorney, Agent, or Firm*—Hickman Palermo Truong & Becker LLP

(57) ABSTRACT

Techniques for changing operations performed relative to digital signal data that represents a recording of a signal are provided. A digital signal data-editing program displays an ordered list of items. Each item in the list corresponds to one or more operations that a user has instructed the program to perform relative to the digital signal data. The order of the items in the list determines the order in which the operations corresponding to those items are performed relative to the digital signal data. In response to user input, the program may perform a change such as inserting a new item into the list, removing an existing item from the list, altering the order of one or more items in the list, etc. The program subsequently modifies the display of the list to reflect the change. The change may be performed without disturbing the last-ordered item in the list.

30 Claims, 6 Drawing Sheets

RANDOM ACCESS ACTION LIST FOR DIGITAL SIGNAL DATA EDITING

FIELD OF THE INVENTION

The present invention relates to data-editing programs and, more specifically, to a digital signal data-editing program that provides a random access action list.

BACKGROUND

There exist many computer programs today that assist a user in editing data on a computer. For example, a word processing program enables a user to enter and modify textual data. A computer-aided drafting program enables a user to enter and modify graphical data. A digital signal-editing program enables a user to load digital signal data, modify the digital signal data, and save the digital signal data. Such a digital signal may represent audio data, for example.

Sometimes, such programs provide an "undo" feature. The "undo" feature can be used to reverse the most recent change that was made to the data that is being edited. For example, three operations might be performed in a particular chronological order relative to data. Operation "X" might be performed first, operation "Y" might be performed next, and operation "Z" might be performed after that. Each operation might produce a different effect relative to the data.

After each of the operations has been performed, a user might decide that he did not want the last operation, operation "Z," to be performed. To place the data back into the state in which the data was prior to the performance of operation "Z," the user can activate the "undo" feature of the editing program. The program remembers the state of the data prior to the most recent operation, so, in response to the activation of the "undo" feature, the program can place the data back into the state in which the data was prior to the performance of operation "Z."

Sometimes, the user might want to keep the most recently performed operation, but undo an operation that was performed previously to that. For example, the user might want to undo operation "Y" but not operation "Z." Assuming that the program remembers the state of the data prior to operations less recent than the most recently performed operation, the user may activate the "undo" feature twice to undo the effects of both operation "Z" and operation "Y." Unfortunately, then the user must invoke features of the program that he previously invoked to cause the program to repeat operation "Z" relative to the data.

This manual re-doing can be tedious. If many operations must be undone and re-done in this manner, then the user may have difficulty remembering which operations need to be re-done. In some cases, the precision required by the user in causing the operations to be performed originally makes an exact repetition of the operations extremely difficult.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a block diagram illustrating an action list in which each item is associated with a checkbox that can be manipulated to turn that item's corresponding operation "on" and "off" relative to the digital signal data, according to an embodiment of the invention;

FIG. 5 is a block diagram illustrating an action list in which a cursor has been positioned above some items and below some other items, according to an embodiment of the invention;

DETAILED DESCRIPTION

Figure 1:
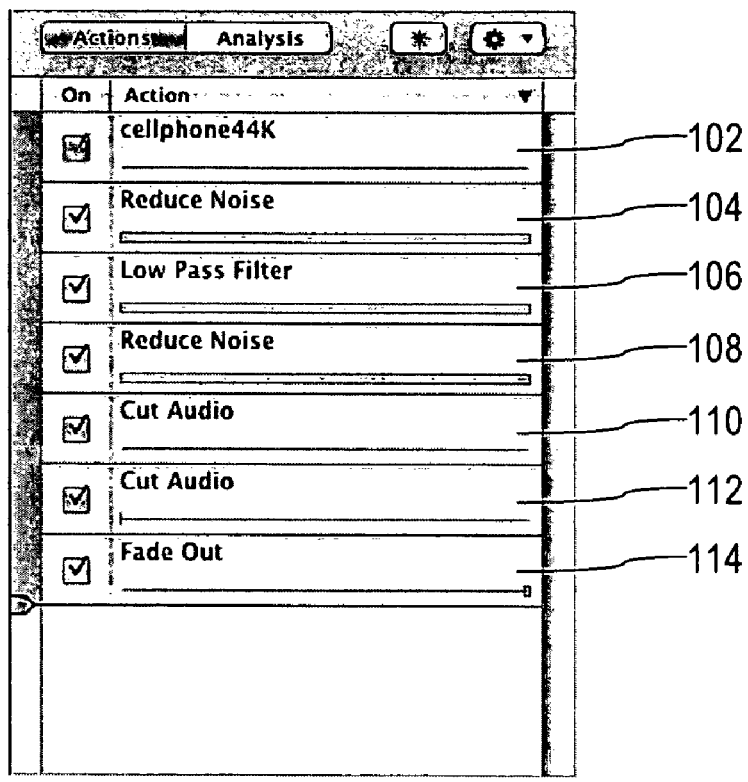
FIG. 1 is a block diagram illustrating a user interface that visually displays an example of an action list, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to techniques described herein, a digital signal data-editing program displays an ordered list of items. The ordered list of items is referred to as the "action list" herein. Each item in the action list corresponds to one or more separate operations that a user has instructed the program to perform relative to digital signal data that represents a recording of a signal, such as an audio signal, for example. Each such operation may have a separate effect on the digital signal data. The order of the items in the action list determines the order in which the operations corresponding to those items are performed relative to the digital signal data. For example, if the action list contains items "A," "B," and "C," in that order, which correspond to operations "X," "Y," and "Z," respectively, then operation "X" is performed before operation "Y," which is performed before operation "Z."

In response to user input, the program may perform a change such as inserting a new item into the action list, removing an existing item from the action list, altering the order of one or more items in the action list, or altering parameters of one or more operations that are represented by items in the action list. The program subsequently modifies the display of the action list to reflect the change.

The change may be performed without disturbing the item that is ordered last (in terms of performance order) in the action list. More specifically, the change may be performed without removing this "last item" from the action list, without altering the operation that corresponds to this "last item," and without causing the order of this "last item" to precede another item's order in the action list. For example, assuming that items "A," "B," and "C" are in the action list, in that order, and that these items correspond to operations "X," "Y," and "Z," respectively, item "B" may be removed from the action list without ever removing item "C" from the action list. After the removal of item "B" from the action list, corresponding operation "Y" no longer affects the digital signal data, but operations "X" and "Z" still do.

A boon of this technique is that a user is not forced to undo and then redo every operation that comes in order after operation "Y." Additionally, displaying the items also allows a user to see, easily, which operations are performed relative to the digital signal data, and the order in which those operations are performed. The freedom that this technique confers upon a user of a digital signal data-editing program encourages the user to experiment and try new and different signal manipulations. The user is relieved of the fear that he will forget a particular state of the digital signal data somewhere in the midst of the performance of experimental operations, or that he will be unable to return the data to a previous state should some of the experimental operations prove to be undesirable.

Example Action List

FIG. 1 is a block diagram illustrating a user interface that visually displays an example of an action list, according to an embodiment of the invention. A digital signal data-editing program may display such a user interface, for example. Action lists according to alternative embodiments of the invention may comprise additional features not shown in this example. Likewise, action lists according to alternative embodiments of the invention may lack some features that are shown in this example.

In one embodiment of the invention, the action list is displayed next to a visual depiction of the digital signal data on which the operations corresponding to the items in the action list are performed. As operations are performed relative to the digital signal data, the depiction of the digital signal data may change to reflect the effects of the operations on the digital signal data. The digital signal data may be displayed as a function of amplitude relative to time, frequency relative to time, or in a variety of other ways.

The action list shown comprises separate items 102-114. The action list shows the items in the order in which the corresponding operations will be performed. According to one embodiment of the invention, whenever a new operation is performed relative to digital signal data that is the current subject of the editing program, an item corresponding to that operation is added to the action list. Typically, items that are automatically added to the action list in response to the performance of new operations are placed at the top or the bottom of the action list, depending on user preferences. In this example, items toward the top of the list correspond to operations that will be performed prior to operations that correspond to items toward the bottom of the list.

Item 102 corresponds to an operation in which a file "cellphone44K" was loaded from persistent storage. The file contains digital signal data that is the subject of the digital signal data-editing program. Item 104 corresponds to a "reduce noise" operation. Such an operation might be performed in response to a user activating a menu item labeled "reduce noise," for example. Item 106 corresponds to a "low pass filter" operation. Item 108 corresponds to another "reduce noise" operation. Item 110 corresponds to a "cut audio" operation. Such an operation might be performed in response to a user selecting a menu item labeled "cut" after making a selection of a portion of the digital signal data. Item 112 corresponds to another "cut audio" operation. The portion of the digital signal data selected in this operation may differ from the portion selected in the operation that corresponds to item 110 above. Item 114 corresponds to a "fade out" operation.

Various other operations may be performed relative to the digital signal data, and for each of one or more of these operations, a corresponding item may be placed in the action list. Examples of some of these operations include: cut, copy, paste, paste mix, clear, trim, fade in, fade out, silence, invert, normalize, adjust amplitude, reverse, swap channels, apply ambient noise, real-time effects, time stretch, and reduce noise. Some of these operations may be custom "plug-in" operations that a user has generated and which have been incorporated into the digital signal data-editing program. Some of these operations may shorten or lengthen the digital signal data. Some of these operations, such as paste and paste mix, may combine two or more signals. One or more operations may allow for resampling, channel insertion, channel removal, and channel reversal.

Additionally, whenever a "marker" is placed within or removed from the digital signal data, the addition or removal may be considered an operation, and a corresponding item may be placed in the action list. Such markers may function to indicate a selected point in time within digital signal data.

In one embodiment of the invention, any operation that could be undone using a traditional "undo" feature is an operation that, when performed, causes a corresponding item to be added automatically to the action list.

Interacting with the Action List

In one embodiment of the invention, a user may modify items in the action list by using a mouse, track ball, light pen, touch pad, or other pointing device. For example, a user may select a particular item in the action list by clicking on that item. For another example, a user may remove a particular item from the action list by clicking on that item and dragging the item out of the vicinity of the action list. For another example, a user may change the order of a particular item in the action list by clicking on that item and dragging that item to a different position in the action list. Other items adjacent to the destination position may adjust to make room for the moved item; similarly, other items adjacent to the vacated source position may adjust to close the gap that would otherwise be left by the movement.

Figure 6:
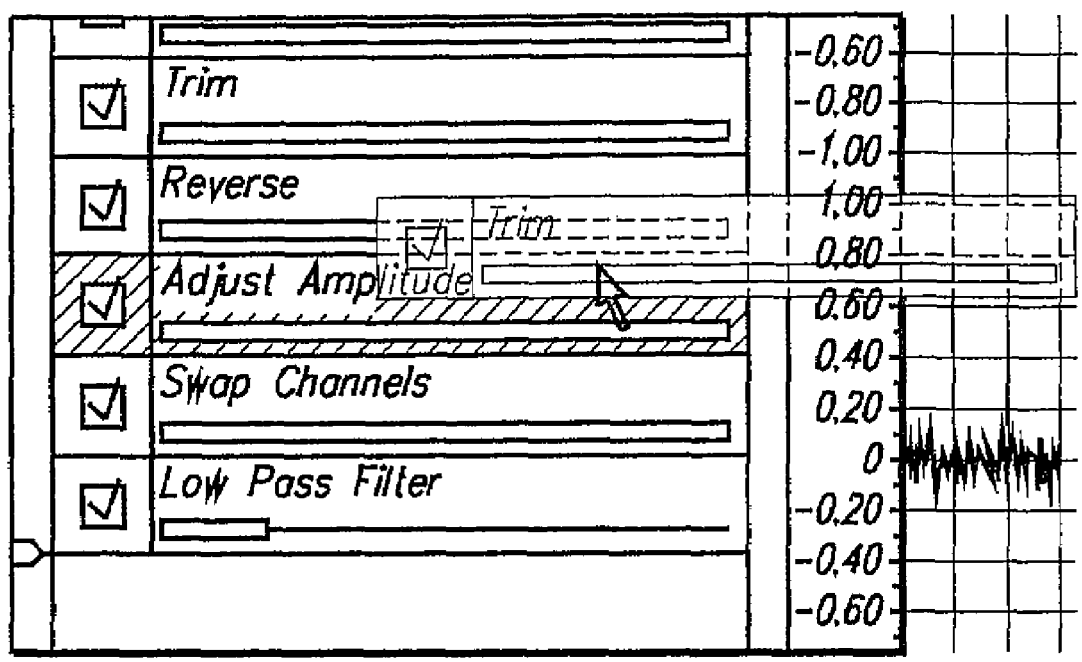
FIG. 6 is a block diagram illustrating an action list in which an item corresponding to a "trim" operation is being dragged from one position in the action list to another position, according to an embodiment of the invention.

FIG. 6 is a block diagram illustrating an action list in which an item corresponding to a "trim" operation is being dragged from one position in the action list to another position, according to an embodiment of the invention. By releasing the mouse button, the user may "drop" the item between the item for the "reverse" operation and the item for the "adjust amplitude" operation. The items for the "adjust amplitude," "swap channels," and "low pass filter" operations would then move down to make room for the repositioned item.

Some other ways of interacting with the action list are described in greater detail below.

Saving and Restoring the Action List

According to one embodiment of the invention, whenever the digital signal data is saved to persistent storage, such as a hard disk drive, the items in the action list are also saved to persistent storage. The order of the items in the action list at the time that the digital signal data was saved is preserved. The action list is associated, on persistent storage, with the digital signal data to which the action list pertains.

Later, when the digital signal data is loaded, or restored, from persistent storage, the associated action list is also restored. As a result, a user may resume editing digital signal data from the point at which he saved the digital signal data. After the digital signal data has been restored, the user may modify items in the action list or the corresponding operations in the same manner as he could prior to saving the digital signal data.

Each operation may be associated with one or more variable parameters. For example, an operation may change the volume of a digital audio signal. A parameter of that operation indicates a value that represents the new volume. According to one embodiment of the invention, the parameters associated with each operation are preserved along with the information in the action list.

In one embodiment of the invention, a separate file is saved and restored for each operation performed relative to the digital signal data. For example, one file may represent the original digital signal data, another file may represent a portion of the digital signal data on which a first operation has been performed, and yet another file may represent another portion of the digital signal data on which a second operation has been performed.

According to one embodiment of the invention, the items in the action list, or a selected subset thereof, can be saved to a script (e.g., AppleScript). A script saved in this manner can be used to apply, to one or more separate files or sets of digital signal data, the same operations that correspond to the saved items. For example, a user may construct a set of items that correspond to operations that reduce noise in a signal, adjust the amplitude of the signal, and resample the signal from 44.1 to 48 kHz. Once saved to a script, the operations corresponding to these items can be applied to a folder of files as a batch process.

Changing an Operation's Parameters

Figure 7:
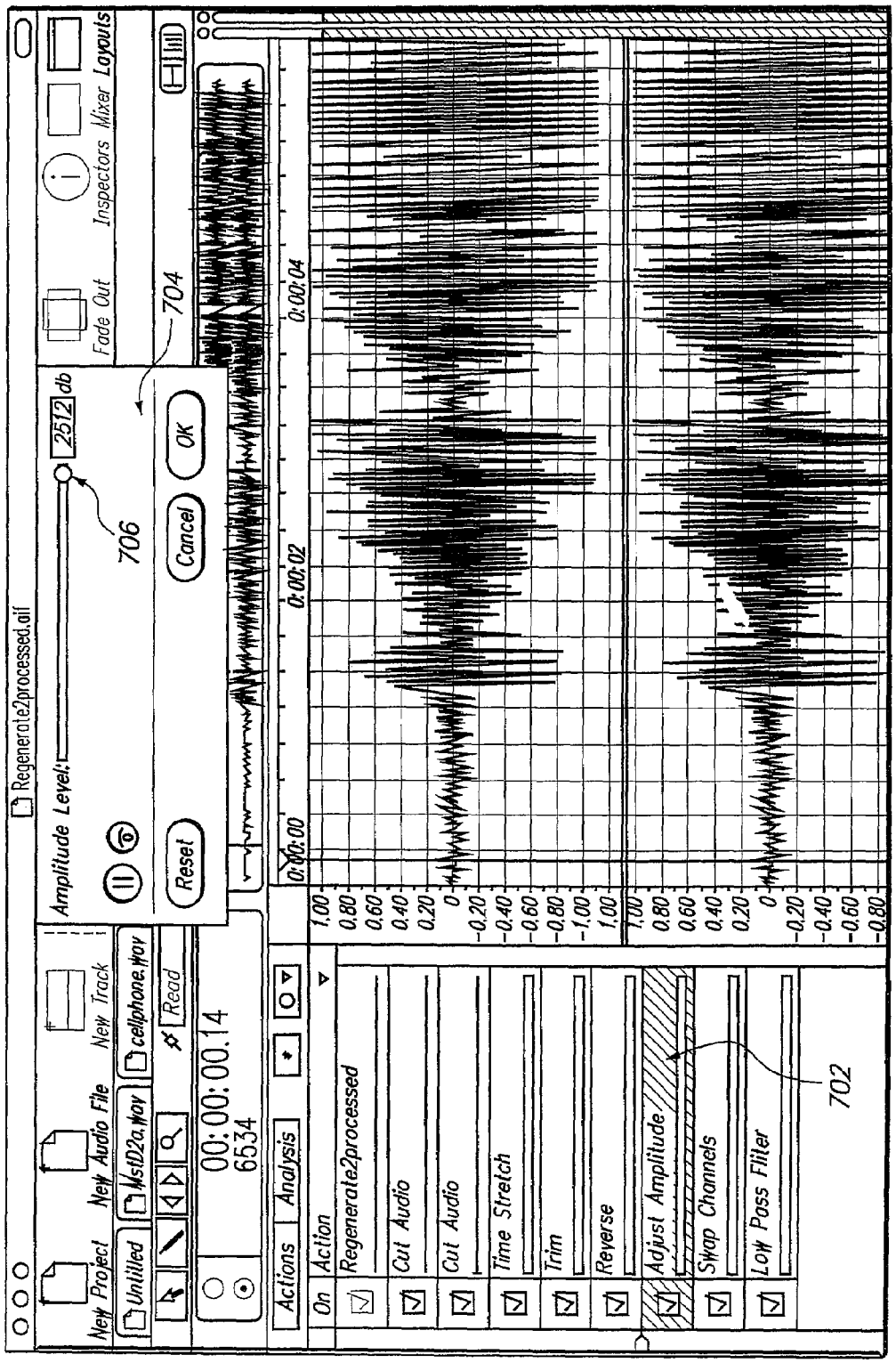
FIG. 7 is a block diagram illustrating an action list in which the parameters of an operation are being modified, according to an embodiment of the invention.

As is discussed above, each operation may be associated with one or more variable parameters. FIG. 7 is a block diagram illustrating an action list in which the parameters of an operation are being modified, according to an embodiment of the invention. FIG. 7 represents a sequence of user-invoked events that bring about such a modification. The sequence represents one way, but not the only way, of modifying operation parameters.

At point 702, a user double-clicks or otherwise chooses an item in the action list. In this example, the user double-clicks the item corresponding to an "adjust amplitude" operation. In response, at point 704, a "sheet" appears. The sheet indicates current settings for parameters of the "adjust amplitude" operation, as indicated at point 706; in this example, the sheet contains a bar with a control that can be slid from left to right to adjust an amplitude level, which is a parameter of the "adjust amplitude" operation.

According to one embodiment of the invention, the digital signal data is modified as an operation's parameter is modified. For example, as the amplitude level is adjusted, the display of the digital signal data may change in "real time" to reflect the effects of the amplitude level as adjusted.

Undoing Changes to the Operation List

In one embodiment of the invention, activating the "undo" feature of the digital signal data-editing program has an effect that differs from the effect that an "undo" feature of a data-editing program traditionally has had. Traditionally, if operations "X," "Y," and "Z" had been performed relative to data in the course of editing that data, then the activation of the "undo" feature would cause the most recently performed operation (operation "Z" in the above example) to be undone, so that the effects of the most recently performed operation were reversed.

However, according to one embodiment of the invention, the activation of the "undo" feature instead causes the most recent change to the action list to be undone. For example, if operations "X," "Y," and "Z" had been performed relative to digital signal data, and the user had, thereafter, moved an item "B" so that item "B" preceded item "A" in the action list, then the activation of the "undo" feature would cause item "B" to be moved back to its previous order after item "A" in the action list. This behavior may be contrasted with systems in which the activation of the "undo" feature would undo operation "Z," it being the operation most recently performed relative to the data.

Toggling Between First-to-Last and Last-to-First Item Display

In an embodiment of the invention described above, the item that corresponds to the operation that will be performed first in order relative to the digital signal data is shown at the top of the action list, while the item that corresponds to the operation that will be performed last in order relative to the digital signal data is shown at the bottom of the action list.

However, in one embodiment of the invention, the reverse is true; the item at the top of the action list corresponds to the operation that will be performed last, and the item at the bottom of the action list corresponds to the operation that will be performed first. In such an embodiment of the invention, items that correspond to newly performed operations are automatically added to the top, rather than the bottom, of the action list. Thus, the action list may appear to be an action "stack."

Figure 2:
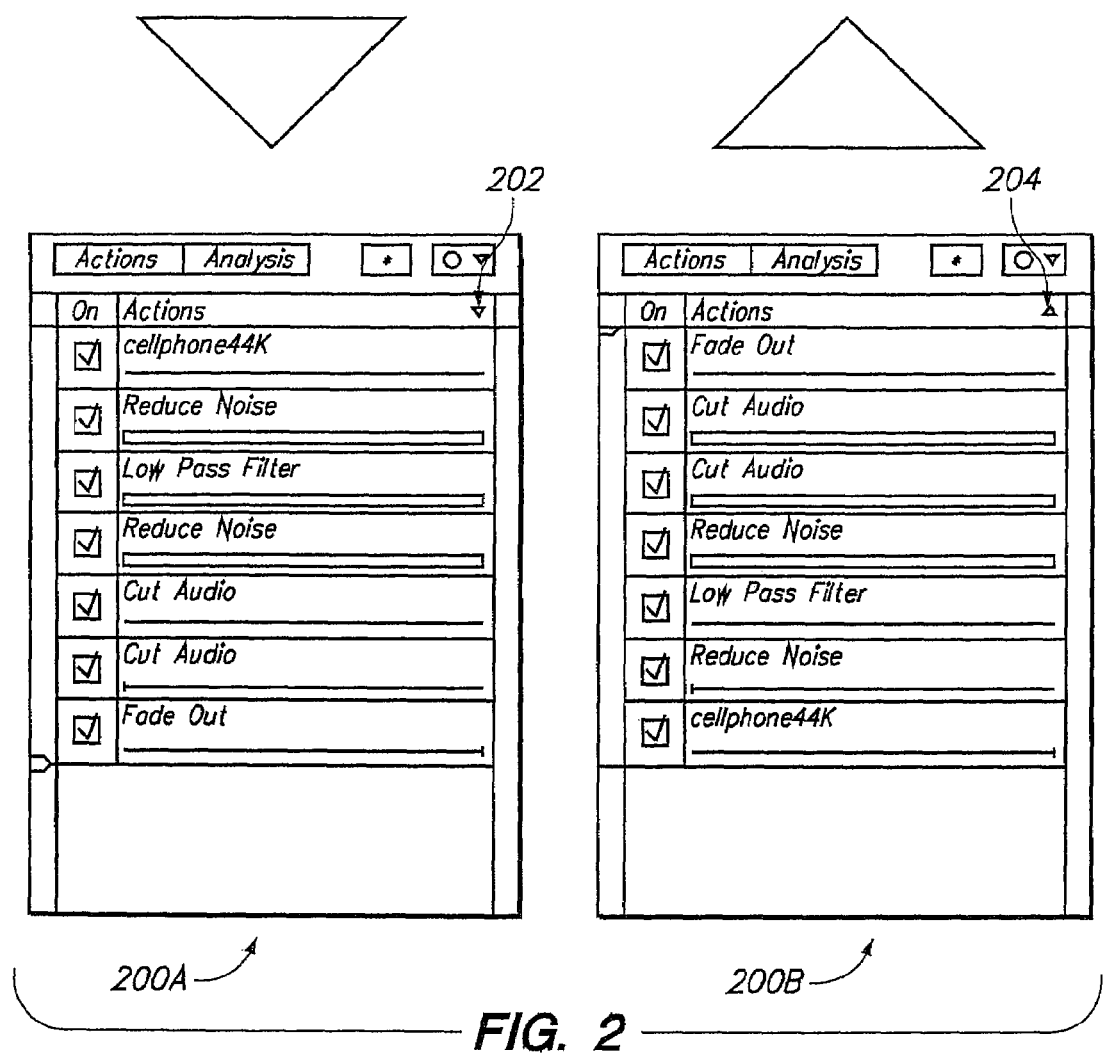
FIG. 2 is a block diagram illustrating two alternative modes of a user interface-one in which items are displayed in the same order as their corresponding operations, and another in which items are displayed in the reverse order as their corresponding operations, according to an embodiment of the invention.

In one embodiment of the invention, the user interface displays a control that, when activated by the user, causes the display of the items in the action list to reverse in order; such a reversal in the displayed order of the items does not alter the order in which the corresponding operations are performed. FIG. 2 is a block diagram illustrating two alternative modes of a user interface—one in which items are displayed in the same order as their corresponding operations, and another in which items are displayed in the reverse order as their corresponding operations, according to an embodiment of the invention.

In action list 200A, the items are displayed in the same order as the operations that the items represent. New items are added to the bottom of action list 200A. In action list 200B, the items are displayed in the reverse order as the operations that the items represent. New items are added to the top of action list 200B, which may be referred to as an "action stack."

In one embodiment of the invention, action list 200A and action list 200B are different display modes of the same action list. Activating a control displayed with the action list toggles between the display modes.

In one embodiment of the invention, the control itself indicates the mode in which the items are currently being displayed: first-to-last, or last-to-first. In the example shown, control 202 in action list 200A points downward, indicating that the items are currently displayed in the same order as their corresponding operations (first-to-last). Control 204 points upward, indicating that the items are currently displayed in the reverse order as their corresponding operations (last-to-first).

Selection Indicators

In one embodiment of the invention, each item in the action list visually indicates which portion of the digital signal data the corresponding operation pertains to. In one embodiment of the invention, each item contains a horizontal line that is shown beneath the identity of the item's corresponding operation. The horizontal line represents the entire signal over time, from the first instance in time at the leftmost end of the line, to the last instance in time at the rightmost end of the line. A box overlapping the line represents the portion of the digital signal data that the item's corresponding operation affects. Some operations might affect the entire digital signal, while other operations might affect only a particular time span within the digital signal.

In other words, the overlapping box proportionally represents the portion of the digital signal data that the user had selected at the time that the user chose the operation to be performed.

Figure 3:
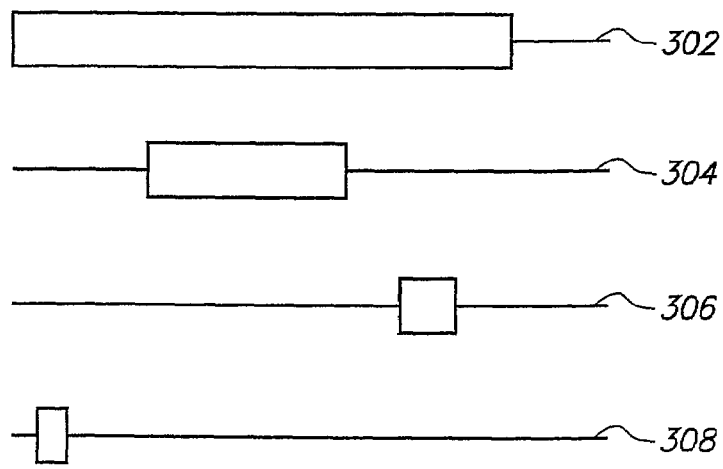
FIG. 3 is a block diagram illustrating various examples of selection indicators, according to an embodiment of the invention.

FIG. 3 is a block diagram illustrating various examples of selection indicators, according to an embodiment of the invention. Referring to FIG. 3, selection indicator 302 indicates that either the entire signal was selected, or that none of the signal was selected (in which case the corresponding operation affects and pertains to the entire signal). Selection indicator 304 indicates that a middle portion of the signal was selected, temporally speaking. Selection indicator 306 indicates that a portion of the signal near the end of the signal, temporally speaking, was selected. Selection indicator 308 indicates that a portion of the signal near the beginning of the signal, temporally speaking, was selected.

Some operations may change the duration, or time length, of the digital signal data. For example, a "cut" operation may shorten the digital signal data. In one embodiment of the invention, the entire horizontal line remains the same length regardless of how the duration of the digital signal data may change. When the duration changes, the selection indicator is "normalized" to indicate the selected portion relative to the changed duration. For example, if a "cut" operation is performed, then the overlapping boxes shown in the selection indicators of items ordered after the "cut" operation's corresponding item may increase in length. Thus, in one embodiment of the invention, the length of the horizontal line always represents the entire time length of the digital signal data, regardless of how that length may grow or shrink as a result of operations performed on the digital signal data.

The selection indicators provide an easy and quick way for a user to determine the extent to which each operation performed relative to the digital signal data affected the digital signal data.

Recalling and Modifying Selected Portions

As is discussed above, each operation may pertain to a particular "selection" within the digital signal data. The selection may be defined as a start time and an end time within the digital signal data. For example, within digital signal data that endures for 10 seconds, a "silence" operation may begin at second 3.2 and end at second 5.7. Sometimes, the user has painstakingly refined the precise moments at which a particular selection starts and ends.

Therefore, according to one embodiment of the invention, a mechanism is provided whereby the exact selection that is associated with a particular operation may be recalled. For example, in response to the user selecting or clicking on a particular item in the action list, the visual display of the digital signal data may be changed to indicate the portion of the digital signal data to which the particular item's corresponding operation pertains—the potion that was selected when the user originally chose to perform the operation. For example, assuming that time is represented along a horizontal axis, a horizontal section of the displayed digital signal data may be highlighted or changed in color to represent the selected portion. Two vertical lines may represent the starting and ending times that are associated with the selection.

After a selected portion has been recalled, the boundaries of the selected portion (the start and end times) may be changed, or additional operations may be performed relative to the selected portion. The ability to recall a previous selection in the above manner frees the user from the burden of attempting to duplicate a previous selection whenever he wants to perform additional operations relative to a previously selected "time slice" of the digital signal data.

Toggling Operations "On" and "Off"

Figures 4, 5:
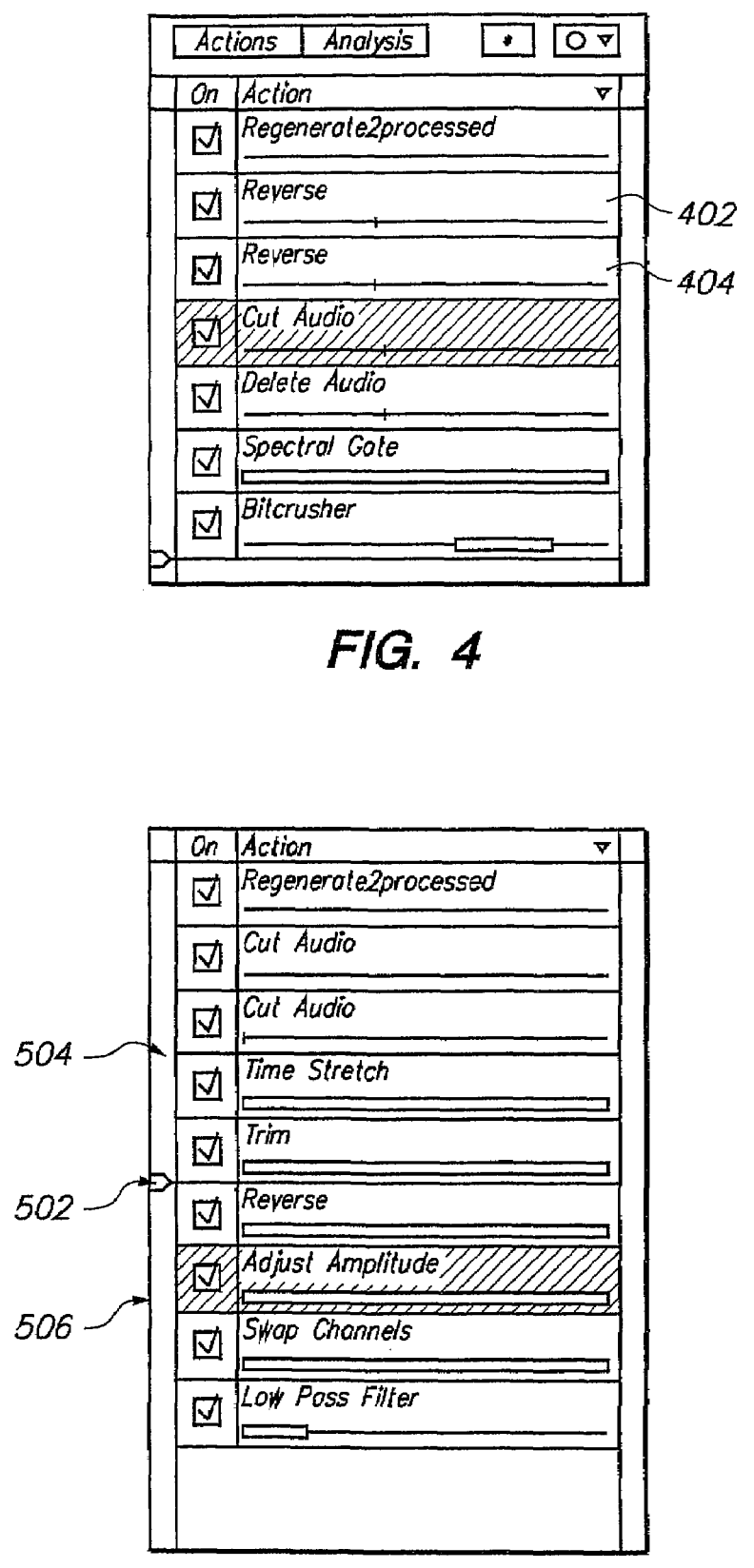

FIG. 4 is a block diagram illustrating an action list in which each item is associated with a checkbox that can be manipulated to turn that item's corresponding operation "on" and "off" relative to the digital signal data, according to an embodiment of the invention. According to one embodiment of the invention, clicking on or otherwise selecting the checkbox that is associated with an item toggles that item's checkbox. If an item's checkbox is not checked (i.e., toggled "off"), then that item's corresponding operation is not performed relative to the digital signal data; the effects of that operation relative to the digital signal data are reversed, at least temporarily. According to one embodiment of the invention, whenever a new item is added to the action list, the new item's checkbox is checked (i.e., toggled "on").

In the example action list shown in FIG. 4, the checkbox for item 402, which is associated with a "reverse" operation, is currently checked. Therefore, the "reverse" operation that is associated with item 402 is currently performed relative to the digital signal data. In contrast, the checkbox for item 404, which is also associated with a "reverse" operation, is not currently checked. Therefore, the "reverse" operation that is associated with item 404 is not currently performed relative to the digital signal data.

According to one embodiment of the invention, whenever an item is toggled "on" or "off," the operations that are associated with "on" items occurring after the toggled item are re-performed relative to the digital signal data. This is because the effects of such later-ordered operations might produce different results given the de-activation or re-activation of the operation that is associated with the toggled item.

Allowing a user to toggle operations on and off in this manner makes it easy for the user to see how digital signal data is affected by each operation in the whole scheme of operations. This operation toggling also allows a user to undo changes that he previously made to the digital signal data while still providing the user with the opportunity to reinstate those changes with little effort.

Movable Item Insertion/Activity Point

As is discussed above, in one embodiment of the invention, new items are added to the action list at either the top or the bottom of the action list, depending on whether the user has chosen the action list to be displayed in first-to-last or last-to-first operation order. According to one embodiment of the invention, new items are inserted into the action list at the point that is currently indicated by a special cursor. A user can move the cursor up and down in the action list by dragging it to different positions.

According to one embodiment of the invention, operations that correspond to items that are displayed below the position of the cursor are not performed relative to the digital signal data; items beneath the cursor's position are in an "inactive" state, at least temporarily. The effect of moving the cursor above an item in the action list is similar to the effect achieved by toggling that item's operation "off," although moving the cursor above an item does not affect the state of that item's checkbox. Dragging the cursor below an item that was previously beneath the cursor restores that item to an active state. Thus, in one embodiment of the invention, the position of the cursor within the action list effectively indicates the "end" of the list.

FIG. 5 is a block diagram illustrating an action list in which a cursor has been positioned above some items and below some other items, according to an embodiment of the invention. Referring to FIG. 5, a cursor 502 (purple in color, according to one embodiment of the invention) is positioned between an item for a "trim" operation and another item for a "reverse" operation. Thus, in this example, the next new item will be inserted between the item for the "trim" operation and the item for the "reverse" operation.

The action list shown in FIG. 5 contains a border region that bounds the items on the left side. The vertical position of the cursor divides this border region into two sections 504 and 506. In one embodiment of the invention, the section 504 above the cursor is presented in a different color than the section 506 below the cursor. This helps to convey, to the user, the notion that operations corresponding to items above the cursor's position will be performed on the digital signal data, but operations corresponding to items below the cursor's position will not.

In one embodiment of the invention, the items below the cursor's position are shaded or "grayed out" to indicate to a user that the items are not currently "active," as in the example action list shown. Three-dimensional visual effects may be used to differentiate between "active" and "inactive" items; "active" items may appear to be "raised," while "inactive" items may appear to be "flat."

Waveform Animation

In one embodiment of the invention, the digital signal data is visually represented as a waveform. In one embodiment of the invention, the waveform animates whenever an item or operation is changed, deleted, or added. The animation that occurs as a result of one of these changes visually depicts to the user the effects of the change relative to the waveform. Instead of merely showing only a "before" and "after" image of the waveform, the digital signal data-editing program may gradually and visually change the image of the waveform, through one or more animation frames, from the waveform prior to the change to the waveform after the change. For example, if an operation is performed that increases the amplitude of a digital audio signal, then the image of the digital audio signal's waveform may gradually grow until its proportions reflect the increased amplitude. This animation draws a user's attention to the exact effects of the change relative to the digital signal data, so that the user can comprehend the effects of even a subtle change in a visual way.

A/B

It is often desirable to compare the effects of two different sets of operations relative to the same digital signal data. The comparison can be made clearer when the results of the different sets can be viewed (or heard) simultaneously or in rapid succession. This simultaneous or rapid comparison is sometimes called "A/Bing."

According to one embodiment of the invention, two different action lists are defined at any moment. The first action list is the current action list. The second action list is the current action list, except with the last item in the current action list made "inactive," so that the operation corresponding to that item is not performed. In response to user input, the action lists, and/or the results of the operations corresponding to the items in the action lists may be displayed simultaneously. Alternatively, the action lists, and/or the results of the operations correspond to the items in the action lists may be swapped back and forth in response to user input, such as the typing of one or more defined keystrokes.

Figure 8:
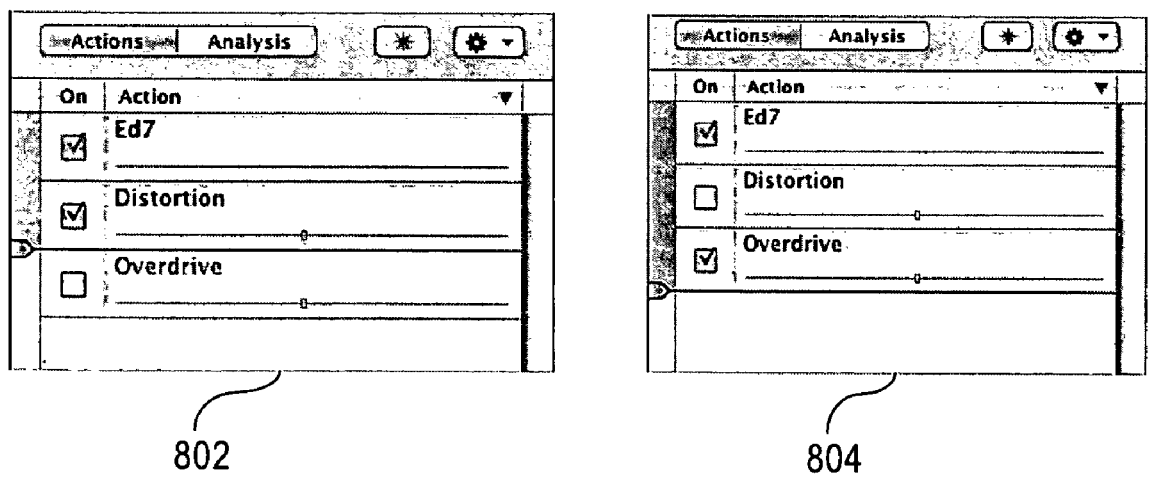
FIG. 8 is a block diagram illustrating multiple action lists that a user can swap between relatively instantaneously or display together, according to an embodiment of the invention.

FIG. 8 is a block diagram illustrating multiple action lists that a user can swap between relatively instantaneously or display together, according to an embodiment of the invention. In action list 802 (the "A" action list), the last item, corresponding to an "overdrive" operation, is inactive. In action list 804 (the "B" action list), the same last item is active. In one embodiment of the invention, a user can cause action list 802 to be displayed side-by-side with action list 804. In one embodiment of the invention, a user can rapidly switch between action list 802 and action list 804. For example, a user may rapidly switch between the action lists by pressing a certain key or combination of keys on the keyboard, or by clicking on a particular graphical control. In one embodiment of the invention, in response to switching to a different action list as described above, the operations that correspond to active items in the "swapped-to" action list are performed on the digital signal data.

If the digital signal data represents an audio signal, then the audio signal, as affected by the operations corresponding to the items in the "swapped-to" action list, may be audibly played to the user when the action list is swapped, so that the user can hear what the audio signal sounds like when the operations corresponding to the "swapped-to" action list are performed. For example, when the user swaps to action list 802, the program may audibly play the audio signal as it sounds without the "overdrive" operation. When the user swaps to action list 804, the program may audibly play the audio signal as it sounds with the "overdrive" operation.

In an embodiment of the invention described above, the second action list is the current action list, except with the last item in the current action list made "inactive." However, in an alternative embodiment of the invention, the second action list may comprise a significantly or entirely different set of items than the first action list. In one embodiment of the invention, the current state of an action list can be "saved" and associated with one or more keystrokes and/or a menu item, so that the action list in that state can be recalled instantly in response to user input.

In one embodiment of the invention, more than two different action lists may be preserved and recalled. In other words, instead of only an "A" action list and a "B" action list, there may also be a "C" action list, a "D" action list, etc. For example, a user might associate a first action list with the keystroke "ALT-1," a second action list with the keystroke "ALT-2," and a third action list with the keystroke "ALT-3." In response to the user pressing "ALT-1," the program would cause the first action list to become active. In response to the user pressing "ALT-2," the program would cause the second action list to become active. In response to the user pressing "ALT-3," the program would cause the third action list to become active. In various embodiments of the invention, either a single action list may be shown at a time, or all selected action lists may be displayed simultaneously. The user's depression of another defined keystroke may bring back the "current" action list prior to the recalling of one or a plurality of "alternative" action lists.

"Flattening" an Action List

If an action list begins to grow too large, it can become unwieldy. Additionally, very large action lists can, in some embodiments of the invention, occupy a significant amount of storage. Thus, in one embodiment of the invention, a feature is provided whereby an action list may be "compressed" or "flattened" in response to defined user input.

When a user instructs a program to "flatten" the action list, all of the operations that correspond to the items in the action list are made permanent relative to the digital signal data, and those items are no longer displayed in the action list. The operations are committed. This can help to reduce the complexity of an editing project. In one embodiment of the invention, the first action, which may correspond to the loading of the current digital signal data, is maintained throughout a flattening operation.

In one embodiment of the invention, after a flattening operation is performed as described above, the activation of an "undo" feature causes the flattering operation to be reversed. In such a case, the items that were removed from the display of the action list as a consequence of flattening are redisplayed in the action list.

"Bouncing" Real-Time Effects

In one embodiment of the invention, a mechanism is provided whereby a user can define a "real-time" effect relative to the digital signal data and then "bounce," or "package" that real-time effect into an item that is then added to the action list. A set of one or more real-time effects may be "bundled" into an item in response to defined user input. The operation corresponding to the added item comprises the real-time effects. By selecting the item in the action list, the user can view and adjust the corresponding real-time effects, similar to the way that the user can view and adjust an operation's parameters, as described above.

A "real-time effect" is an operation that defines a change to digital signal data over time. For example, a volume real-time effect may comprise a series of points in time. The user may associate each such point in time with a different value. In this example, such values may correspond to volume levels. Thus, using real-time effects, a user may cause the volume of an audio signal to increase to a first level during the first 3 seconds, then decrease to a second level during the next 2 seconds, and then increase again during the next 5 seconds, for example.

A real-time effect may be represented visually as a line graph, in which the points in time are vertices at which the lines of the graph join. Alternatively, the real-time effect may be represented through one or more curves instead of lines. The real-time effect may correspond to a mathematical function. A real-time effect may pertain to a selected portion of digital signal data or to all of the digital signal data. In one sense, a real-time effect may be thought of as a filter through which a digital signal passes to produce a desired effect.

In one embodiment of the invention, items that correspond to real-time effect operations can be manipulated in the same manner as any other item as described above. The values corresponding to the real-time effect's points in time become the parameters of the operation corresponding to the item into which the real-time effect was "bounced."

Ways of Defining a Selection

As is discussed above, a selection of a portion of digital signal data may be defined by a start time and an end time. In one embodiment of the invention, the start time and the end time that define a particular selection are absolute, and do not change even if the digital signal data changes—even if a portion of the digital signal data within the selection is later "cut."

However, in an alternative embodiment of the invention, the beginning and ending of a selection are not defined by absolute times. Instead, in such an embodiment of the invention, the beginning and ending of a selection are defined relative to the portion of data that is contained within the selection, regardless of where that portion of data occurs time-wise. Thus, if the portion of data to which a selection pertains "moves" to a different position (i.e., time) within a set of digital signal data, the selection continues to pertain to that portion of data at the new position, rather than the portion of data that subsequently occupies the position from which the portion was moved.

In one embodiment of the invention, for each item, a user is presented with an option of making selections corresponding to that item based on absolute position or based on the data contained with the selections. Different items may be associated with different methods of defining a selection's beginning and end.

Labelling Items

According to one embodiment of the invention, a user can modify the descriptive text within each item. This functionality better enables a user to distinguish between two items that correspond to similarly named operations (e.g., two separate items that both correspond to "reverse" operations). Furthermore, according to one embodiment of the invention, each item may be associated with user-customizable "subtext" that is displayed in the item separately from the item's main descriptive text. For example, the operation-identifying text may be presented in a larger font than the descriptive subtext that is displayed beneath the operation-identifying text. Such subtext may be used to annotate items in whatever way that a user finds useful.

Previewing Operations

In one embodiment of the invention, at least some operations can be previewed before the operations are applied to the digital signal data. In one embodiment of the invention, such previewing is achieved via a play/pause button pair, along with a bypass feature and a gain slider control. The bypass feature allows a user to toggle the operation "off" temporarily. The gain slider control controls the volume of the preview; this can make it easier for a user to hear the effects of the operation.

Hardware Overview

Figure 9:
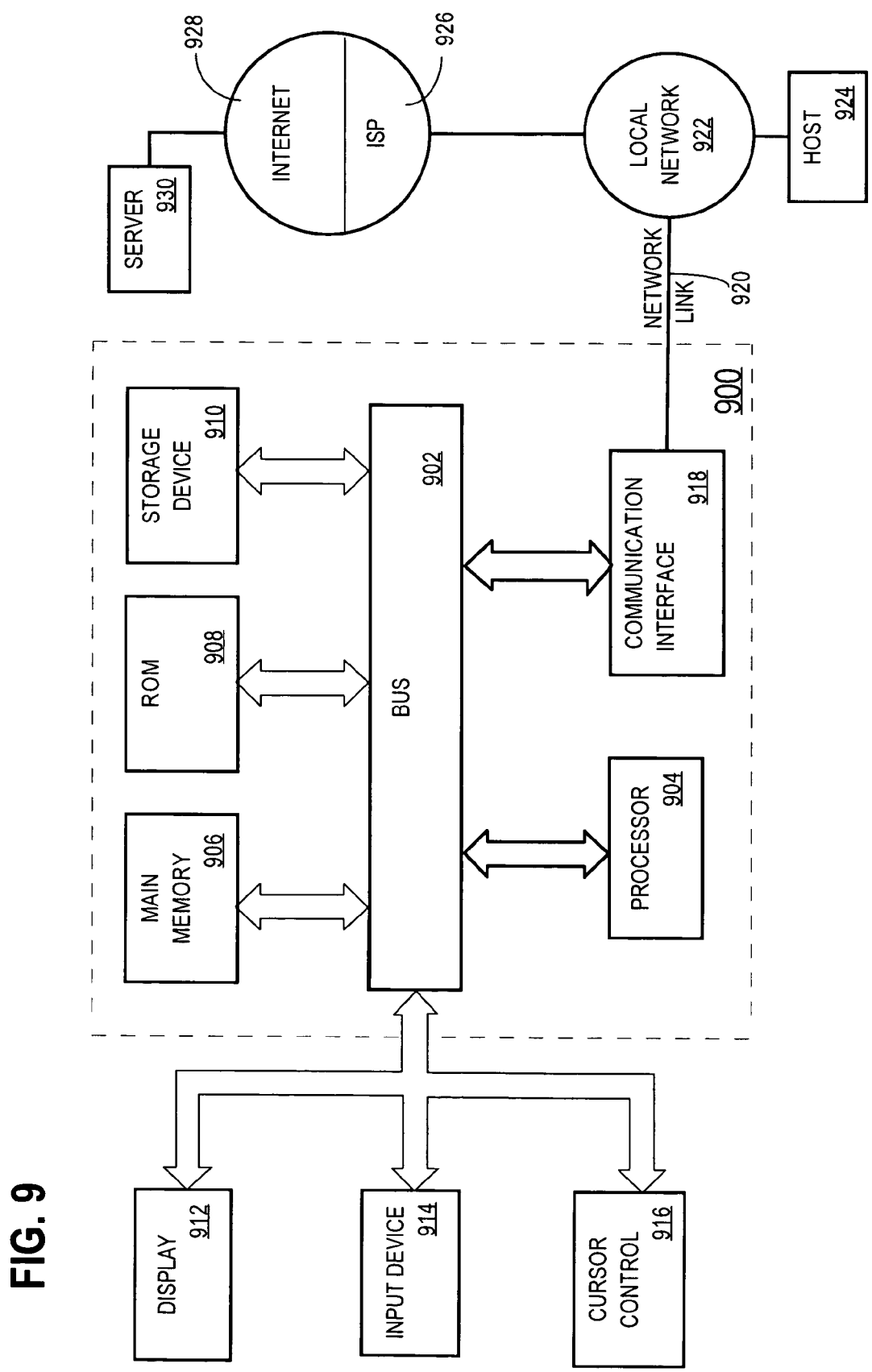
FIG. 9 is a block diagram of a computer system on which embodiments of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of changing operations performed relative to digital signal data that represents a recording of a signal, the method comprising:
generating a display of a particular ordered list of items containing only items that specify editing operations that both (a) have been chosen to be performed relative to the digital signal data and (b) have been added to the particular ordered list in response to a user's commands to perform those editing operations;
wherein the order of items in the particular ordered list determines an order in which operations that correspond to the items are performed relative to the digital signal data;
wherein the particular ordered list includes, at one end of the particular ordered list, a particular item that corresponds to a particular operation that is to be performed after all other operations represented by items in the particular ordered list have been performed; and
in response to user input, (a) performing, to the digital signal data, a particular change that does not alter the particular operation and (b) modifying the display of the particular ordered list to reflect the particular change;
wherein after modifying the display, the particular item remains at said one end of the particular ordered list, indicating that said particular operation continues to be the operation performed after all other operations represented by items in the particular ordered list have been performed.

2. The method of claim 1, further comprising modifying the display by either removing an item from the particular ordered list, or altering an order of an item in the particular ordered list.

3. The method of claim 1, further comprising:
in response to an activation of an "undo" feature, undoing the modifying of the display, indicating that the particular ordered list is in a state prior to the modifying of the display.

4. The method of claim 1, further comprising generating the display to show, in the particular ordered list, at least one item that (a) is associated with a digital signal data portion that is less than all of the digital signal data, and (b) contains a visual representation of a position and size of the portion relative to the digital signal data.

5. The method of claim 1, further comprising:
in response to a selection of a second item other than the particular item in the particular ordered list, determining a portion of the digital signal data that is associated with the second item; and
displaying the portion of the digital signal data differently from parts of the digital signal that are not within the portion.

6. The method of claim 1, further comprising:
preventing operations that correspond to items that occur on a particular side of a user-movable cursor within the particular ordered list from being performed relative to the digital signal data; and
displaying the digital signal data as the digital signal data would be if the operations that correspond to the items that occur on the particular side were not performed relative to the digital signal data.

7. The method of claim 1, further comprising inserting the new item into the particular ordered list by inserting the new item at a point in the particular ordered list that is designated by a user-movable cursor.

8. The method of claim 1, further comprising:
in response to user input, displaying a second ordered list of items that (a) represent operations that have been chosen to be performed relative to the digital signal data, and (b) differ from one or more operations that correspond to items in the particular ordered list.

9. The method of claim 1, further comprising:
in response to user input, reversing a display order of items in the particular ordered list, while maintaining and not changing the order of operations that correspond to items in the particular ordered list.

10. The method of claim 1, further comprising:
in response to user input, removing one or more items from the particular ordered list and making operations that correspond to the one or more items permanent relative to the digital signal data.

11. The method of claim 1, further comprising:
loading the particular ordered list from persistent storage in conjunction with loading the digital signal data from persistent storage.

12. The method of claim 1, further comprising:
animating a display of the digital signal data to illustrate an effect of an operation relative to the digital signal data.

13. A method of changing operations performed relative to digital signal data that represents a recording of a signal, the method comprising:
generating a display of an ordered list of items containing items that specify editing operations that both (a) have been chosen to be performed relative to the digital signal data and (b) have been added to the ordered list of items in response to a user's commands to perform those editing operations;
wherein the order of items in the ordered list determines an order in which operations that correspond to the items are performed relative to the digital signal data;
wherein the ordered list includes, at one end of the ordered list, a particular item that corresponds to a particular operation that is to be performed after all other operations represented by items in the ordered list have been performed; and
in response to user input, performing, to the digital signal data, a particular change that does not alter the particular operation and that alters a selected operation that is represented by an item in the ordered list;
wherein after performing the particular change, the particular item remains at said one end of the ordered list, indicating that said particular operation continues to be the operation performed after all other operations represented by items in the ordered list have been performed.

14. The method of claim 13, further comprising altering one or more parameters of the selected operation.

15. The method of claim 13, further comprising altering one or more operation's parameters that represent a change to the digital signal data over time by specifying one or more values at one or more points in time.

16. A volatile or non-volatile computer-readable storage medium carrying one or more sequences of instructions which, when executed by one or more processors, causes the one or more processors to perform the method recited in claim 1.

17. A volatile or non-volatile computer-readable storage medium carrying one or more sequences of instructions which, when executed by one or more processors, causes the one or more processors to perform the method recited in claim 2.

18. A volatile or non-volatile computer-readable storage medium carrying one or more sequences of instructions which, when executed by one or more processors, causes the one or more processors to perform the method recited in claim 3.

19. A volatile or non-volatile computer-readable storage medium carrying one or more sequences of instructions which, when executed by one or more processors, causes the one or more processors to perform the method recited in claim 4.

20. A volatile or non-volatile computer-readable storage medium carrying one or more sequences of instructions which, when executed by one or more processors, causes the one or more processors to perform the method recited in claim 5.

21. A volatile or non-volatile computer-readable storage medium carrying one or more sequences of instructions which, when executed by one or more processors, causes the one or more processors to perform the method recited in claim 6.

22. A volatile or non-volatile computer-readable storage medium carrying one or more sequences of instructions which, when executed by one or more processors, causes the one or more processors to perform the method recited in claim 7.

23. A volatile or non-volatile computer-readable storage medium carrying one or more sequences of instructions which, when executed by one or more processors, causes the one or more processors to perform the method recited in claim 8.

24. A volatile or non-volatile computer-readable storage medium carrying one or more sequences of instructions which, when executed by one or more processors, causes the one or more processors to perform the method recited in claim 9.

25. A volatile or non-volatile computer-readable storage medium carrying one or more sequences of instructions which, when executed by one or more processors, causes the one or more processors to perform the method recited in claim 10.

26. A volatile or non-volatile computer-readable storage medium carrying one or more sequences of instructions which, when executed by one or more processors, causes the one or more processors to perform the method recited in claim 11.

27. A volatile or non-volatile computer-readable storage medium carrying one or more sequences of instructions which, when executed by one or more processors, causes the one or more processors to perform the method recited in claim 12.

28. A volatile or non-volatile computer-readable storage medium carrying one or more sequences of instructions which, when executed by one or more processors, causes the one or more processors to perform the method recited in claim 13.

29. A volatile or non-volatile computer-readable storage medium carrying one or more sequences of instructions which, when executed by one or more processors, causes the one or more processors to perform the method recited in claim 14.

30. A volatile or non-volatile computer-readable storage medium carrying one or more sequences of instructions which, when executed by one or more processors, causes the one or more processors to perform the method recited in claim 15.

* * * * *